(12) United States Patent
Rosier

(10) Patent No.: US 9,430,504 B2
(45) Date of Patent: Aug. 30, 2016

(54) SYSTEMS AND METHODS FOR DYNAMICALLY INTERCEPTING AND ADJUSTING PERSISTENCE BEHAVIORS VIA RUNTIME CONFIGURATION

(71) Applicant: Benefitfocus.com, Inc., Charleston, SC (US)

(72) Inventor: Michael Rosier, Mt. Pleasant, SC (US)

(73) Assignee: BENEFITFOCUS.COM, INC., Charleston, SC (US)

( * ) Notice: Subject to any disclaimer, the term of this patent is extended or adjusted under 35 U.S.C. 154(b) by 183 days.

(21) Appl. No.: 14/491,549

(22) Filed: Sep. 19, 2014

(65) Prior Publication Data

US 2016/0085779 A1    Mar. 24, 2016

(51) Int. Cl.
*G06F 17/30*    (2006.01)

(52) U.S. Cl.
CPC .............................. *G06F 17/30297* (2013.01)

(58) Field of Classification Search
None
See application file for complete search history.

(56) References Cited

U.S. PATENT DOCUMENTS

| | | | |
|---|---|---|---|
| 6,360,223 B1 | 3/2002 | Ng et al. | |
| 7,149,730 B2 | 12/2006 | Mullins et al. | |
| 7,599,948 B2* | 10/2009 | Thompson | G06F 17/3056 |
| 8,082,490 B2* | 12/2011 | Yan | G06Q 10/10 |
| | | | 715/224 |
| 8,145,685 B2* | 3/2012 | Thompson | G06F 17/3056 |
| | | | 707/804 |
| 8,280,924 B2 | 10/2012 | Olenick et al. | |
| 8,326,888 B2* | 12/2012 | Schoen | G06F 17/30286 |
| | | | 707/802 |
| 2003/0163567 A1* | 8/2003 | McMorris | H04L 29/06 |
| | | | 709/225 |
| 2006/0143223 A1* | 6/2006 | Ivanova | G06F 9/4435 |
| 2010/0142406 A1 | 6/2010 | Goring et al. | |
| 2010/0250625 A1 | 9/2010 | Olenick et al. | |
| 2013/0173669 A1 | 7/2013 | Tang et al. | |
| 2014/0280368 A1 | 9/2014 | Kemmler et al. | |
| 2015/0220327 A1* | 8/2015 | Poon | G06F 17/30297 |
| | | | 717/120 |

FOREIGN PATENT DOCUMENTS

WO    2012054860 A1    4/2012

OTHER PUBLICATIONS

"Object to Relational Mapping Concepts," CocoBase Enterprise O/R, Dynamic Mapping for the Enterprise Version 4.0, Document No. CB-MC-R003-101702, © 1993-2001, Thought Incorporated, 14 pgs.
International Search Report and Written Opinion for PCT/US2015/048274 filed Sep. 3, 2015, and mailed from the International Searching Authority on Dec. 14, 2015, 9 pgs.

* cited by examiner

*Primary Examiner* — Belix M Ortiz Ditren
(74) *Attorney, Agent, or Firm* — Stoel Rives LLP

(57) ABSTRACT

The systems and methods described herein relate to dynamic runtime modifications of an object-relational mapping behavior associated with a relational persistence layer. In various embodiments, access to a relational persistence layer, such as a relational database management system may be provided via an object-relational mapper (ORM). The ORM may map data from the relational persistence layer to an object-oriented domain model. The ORM may include a plurality of field mappers configured with an original mapping strategy to map an entity field from the relational persistence layer to the object-oriented domain model. One or more of the field mappers may be configured with a dynamic adjustment strategy that allows the selected field mapper(s) to be injected with a temporary or conditional mapping behavior. The dynamic adjustment strategy may be initialized with the field mapper at startup, while the injection of temporary or conditional mappings may be performed during runtime.

26 Claims, 7 Drawing Sheets

FIG. 7A

Entity Persistence Adjustments

Some entities are receiving dynamic adjustments to influence their database interactions. Probably these adjustments have been specifically configured to prevent errors when the application attempts to load or save a database field that is still in progress or migrating data.

Sponsor Product
- Field "metalName" adjusted with strategy "Only Adjust If Column Does Not Exist"
  ○ Not adjusting standard behaviors because latest check indicates: SPONSOR_PRODUCT_CFG.METAL_NM functioning correctly

FIG. 7B

Entity Persistence Adjustments

Some entities are receiving dynamic adjustments to influence their database interactions. Probably these adjustments have been specifically configured to prevent errors when the application attempts to load or save a database field that is still in progress or migrating data.

Agency
- Field "httpDomainNameRequiredForAgentsToAuthenticate" adjusted with strategy "Adjust To Always Load Specific Value"
  ○ Adjusting the entity load to receive field value: http://some.domain.com
  ○ Adjusting the entity save to record: [ ignore field ]

SYSTEMS AND METHODS FOR DYNAMICALLY INTERCEPTING AND ADJUSTING PERSISTENCE BEHAVIORS VIA RUNTIME CONFIGURATION

TECHNICAL FIELD

This application relates to systems and methods for dynamically adjusting an object-relational mapping, or other database schema, during runtime by injecting a temporary or conditional mapping behavior into one or more field mappers of an object-relational mapper, or other database management mapper.

BRIEF DESCRIPTION OF THE DRAWINGS

FIG. 7A illustrates an example of a standard field mapper being applied when the conditions for an injected conditional mapping behavior are not met.

FIG. 7B illustrates an example of an injected conditional mapping behavior being implemented when a specific condition is met.

DETAILED DESCRIPTION

Figure 1:
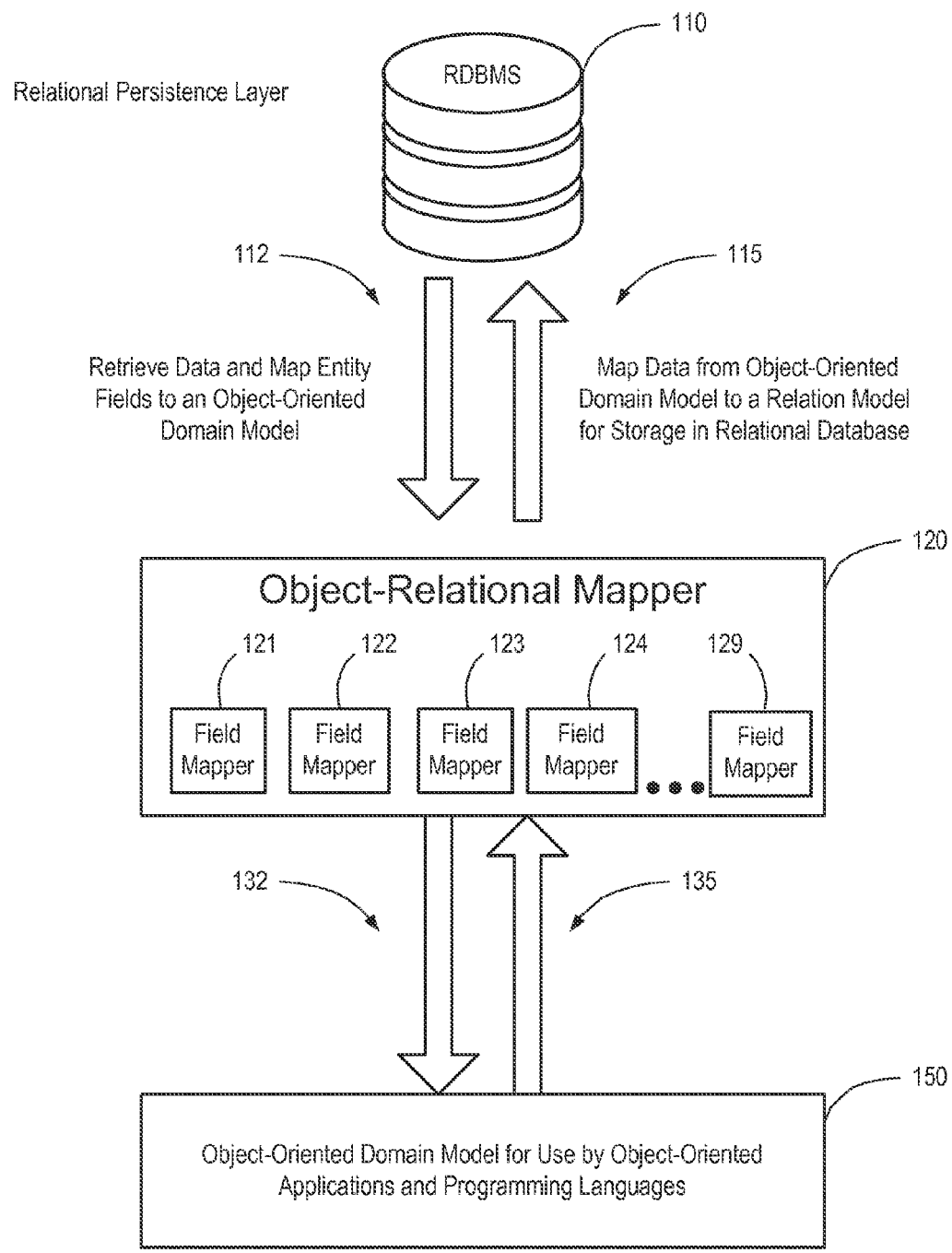
FIG. 1 is a functional block diagram that includes an object-relational mapper (ORM) with multiple static field mappers for mapping field entities from the relational persistence layer to objects in an object-oriented domain model.

Object-relational mappers (ORMs) facilitate the usage of relational databases, such as Structured Query Language (SQL) databases, by applications based on object-oriented programming languages (OOPLs). A relational database may be a part of a relational persistence layer that provides persistent storage and access to data to an object-oriented application (i.e., an application written, at least in part, using an OOPL).

A relational database may store data in tables having rows and columns (fields) according to logic structure or schema. An ORM may generate a virtual object-oriented database of the relational database on initialization for use by one or more associated object-oriented applications. Thus, a programmer programming in an OOPL can interact with the database as if it were an object-oriented database and ignore the complexities of interacting with a relational database using an OOPL. The ORM allows the object-oriented application to transparently use the relational database as part of an underlying persistence layer to store persistent data.

An ORM allows, for example, a programmer familiar with Java to program in Java and write code to interact with familiar object-oriented classes without having to worry about the fact that the underlying persistence layer comprises a relational database management system (RDBMS).

While the presently described features, benefits, advantages, examples, and embodiments are described with respect to relational databases being mapped for use with OOPL, it is appreciated that similar approaches, steps, and methods may be implemented for a wide variety of database mappings. For example, similar principles and advantages may be attained in a situation in which a key-value data store is used as the persistent layer. Other examples could include any permutation of persistent layers including relational databases, key-value data stores, document stores, graph data stores, tabular databases, multivalue databases, cell databases, and resource description frameworks (RDFS) in which it is desired to use a programming language or other database interface that does not use the same schema as the underlying database, where such programming languages be object-oriented or otherwise.

However, for sake of brevity, the remainder of the specification provides examples and details with regard to relational databases being used in combination with OOPLs. It will be readily appreciated that the same principles can be applied to other types of persistent data stores and in combination with other types of tools, languages, and the like that access such persistent data stores.

Various ORMs are available as "off the shelf" products that provide a generic mapping or semi-custom mapping of entity fields from the relational persistence layer to a chosen object-oriented domain model. Additionally, a programmer may choose to write a customized ORM that provides a tailored mapping between entity fields from the relational persistence layer to a chosen object-oriented domain model. In both such embodiments, the ORM includes various field mappers defining how the entity fields of the relational persistence layer should be mapped to the object-oriented domain model. The field mappers are considered static in that once they are initialized and mapped, they do not change. In fact, once initialized, the ORM may generate an error if an object-oriented application attempts to access (load or persist) data in a non-existent entity field or to access data using an incorrect data type.

In various embodiments, an ORM may allow for a dynamic adjustment of one or more field mappers prior to initialization. That is, a system may be shut down, and the mapping behaviors of one or more field mappers may be modified or adjusted prior to system initialization. Once the system is initialized, the field mapper may implement the modified or adjusted mapping behavior. However, such dynamic pre-initialization adjustments cannot be performed in real time or during runtime.

Thus, when a software system uses a persistence mechanism, the ORM may be difficult to change at runtime; even if mappings are dynamically identified at runtime, this would typically only be done at initialization because continual rediscovery (remapping) would have a significant performance impact. Moreover, traditional customized mapping adjustments may be difficult to remove or delete later without another system restart and/or software system changes. Accordingly, such mapping adjustment may have significant performance impacts for extended periods of time despite being only relevant for a specific scenario or period of time.

The present systems and methods provide various embodiments for the dynamic modification of an object-relational mapping behavior associated with a relational persistence layer in real time (e.g., a runtime modification/adjustment that does not require re-initialization or shutdown) without any significant performance impact.

For instance, if no adjustment is applied to a mapper, then the performance and error handling is effectively equivalent to the system prior to the dynamic adjustments. If a dynamic adjustment is applied, then the performance will be the same as if the adjusted mapping behavior had been originally defined as the sole mapping behavior. Finally, if a dynamic adjustment is injected that is implemented only in response to a predefined event (e.g., when a temporal or conditional state is satisfied), then the performance impact is significant only to the extent of the performance cost of the actual dynamic adjustment (for example, if the dynamic adjustment is implemented via special scripting implementation, then that impact might be higher than some of the more basic adjustments).

The ability to dynamically adjust persistence behaviors allows an application system to remain stable even if the underlying persistence mechanism (i.e., persistence layer) may be changing arbitrarily, may be "out of sync," and/or may be undergoing a migration.

In various embodiments, an object-oriented application may need to access (e.g., store, read, write, modify, persist, etc.) data stored in a relational persistence layer, such as an RDBMS. The object-oriented application may interact with the relational persistence layer via an ORM. The ORM may include various field mappers each configured with an original mapping strategy for mapping an entity field from the relational persistence layer to an object-oriented domain model, such as an object-oriented model used by Java or C++.

To provide for dynamic runtime modification of a field mapper, one or more field mappers may be configured with a dynamic adjustment strategy that wraps the original mapping strategy for mapping entity field(s) with an injected temporary or conditional mapping behavior that is different from the original mapping strategy.

The injected temporary or conditional mapping behavior may be modified and/or adjusted during runtime without requiring re-initialization. Accordingly, a temporary or conditional mapping behavior may be injected into the ORM in real time and or the mapping behavior may be modified (e.g., a new injection) in real time.

Although dynamically modifiable, the relatively static ORM can maintain high performance for established mappings and allow the dynamic adjustments to compensate for any disagreement between the ORM and the persistence implementation (i.e., persistence layer). Moreover, the proposed embodiments require minimal or no prep work to identify that a particular mapping is possibly in a state that may need adjustment. Rather, the adjustments/modifications can be immediately applied at runtime when the temporal or conditional state is met.

Dynamically adjusting an object-relational mapping during runtime by injecting a temporary or conditional mapping behavior into one or more field mappers of an ORM may be particularly useful in a system where the application software and the persistence layer need to support overlapping application versions or data migrations while maintaining uninterrupted system availability. This may be a relatively common situation in large distributed systems or in the event of rapidly iterating software deployments.

In some embodiments, the injected mapping behavior may be a conditional mapping behavior. In such embodiments, the original mapping strategy of the field mappers may be implemented unless specific conditions are met. For instance, in some embodiments, the conditional mapping behavior may override the original mapping strategy when a predetermined event has occurred or is occurring.

Events that trigger an injected conditional mapping behavior might include, for example, a migration of the relational persistence layer or a mismatch data type between the object-oriented application and the relational persistence layer. In various embodiments, the event may comprise a determination that an application has requested invalid access to the relational persistence layer (e.g., the specified column does not exist in the relational database). In such an embodiment, the injected temporary or conditional mapping behavior may cause the selected field mapper to return a proxy value, even though no data is actually persisted. Thus, the field mapper may effectively map a non-existent entity field from the relational persistence layer to the object-oriented domain model with a proxy value.

In various embodiments, the injected mapping behavior may comprise a temporary mapping behavior that causes the selected field mapper to map an entity field from the relational persistence layer to the object-oriented domain model with a specific proxy value, regardless of the actual persisted data in the entity field. This might be appropriately named AdjustToAlwaysLoadSpecificValue. This mapping behavior may make the field appear to have been persisted with a single configured value, regardless of the actual persisted value. Any values updated by the application might be ignored when persisting data. In various embodiments, such a temporary mapping behavior may be used to provide a backwards-compatible value for a new field that is not yet implemented by the persistence mechanism, or to immediately hide/deactivate data that is being manipulated by another process and should not be visible yet.

In various embodiments, the injected mapping behavior may comprise a temporary or conditional mapping behavior that causes the selected field mapper to persist data in a currently non-existent entity field of the relational persistence layer as soon as the non-existent entity field is made available. This might be appropriately named OnlyAdjustIfColumnDoesNotExist. Such a mapping behavior may check the database to see if the underlying persistence layer supports the unadjusted mapping (i.e., the original mapping strategy). That is, the injected mapping behavior will not interrupt the normal behavior unless the SQL column does not exist or does not have the appropriate data type. However, if the standard, original mapping strategy is not currently supported, the dynamic adjustment strategy may cause the field mapper to adjust field values based on a configuration supplied via the strategy. Such an adjustment may allow the application to persist new fields as soon as they are available, and yet avoid errors during migration.

In various embodiments, the injected mapping behavior may comprise a temporary or conditional mapping behavior that causes the selected field mapper to map an entity field from the relational persistence layer to the object-oriented domain model with a contextual value, regardless of the actual persisted data in the entity field. This might be appropriately named AdjustFieldBasedOnContext. This mapping behavior may adjust the perceived field value based on configured rules.

Such a behavior modification might be used to temporarily or conditionally imply the value of a field to be a calculated value while the actual persistent value is being migrated. In various embodiments, an AdjustFieldBasedOnContext mapping behavior may be used to dynamically adjust values so that "beta" application functionality would be activated only for "opt in" users or only in scenarios that are well-qualified for use while the new functionality is being evaluated.

In various embodiments, the injected mapping behavior may comprise a temporary or conditional mapping behavior that causes the selected field mapper to perform an action based on a determination that persisted data is corrupt. This might be appropriately named CheckForCorruptData. This mapping behavior may be used to temporarily or conditionally check if a field (or an entire or portion of a record) is in a valid state. The strategy configuration may define one or more actions to take when data is identified as "corrupt." Possible actions include, but are not limited to, automatically cleaning up the corrupt data, masking the corrupt data, logging the corrupt status for later analysis, or aborting loading the data to provide an explicit "root cause" failure and prevent downstream errors.

In other embodiments, the injected mapping behavior may comprise a temporary or conditional mapping behavior that causes the selected field mapper to check if the current user has appropriate permissions to view the data being loaded. This might be appropriately named CheckUserPermissions. If inadequate permissions are identified, the mapping may abort loading the field or even the entire object/record. The dynamic adjustment strategy may define whether this should be considered a security error (to be logged for threat monitoring) or if silently hiding the data is sufficient.

An example of a CheckUserPermissions mapping behavior may be as follows:
  CheckUserPermissions: {"triggerAttribute": "visibleToUsers", "triggerValues": ["topSecret", "superSecret"], "authorized Users": ["user1", "jsmith", "mrosier"]}

Thus, the configuration defines a strategy by specifying a name for the strategy and a payload that describes the strategy's behavior. In the example above, the strategy is called "CheckUserPermissions" and is configured to check if the "visibleToUsers" field is one of the trigger values (topSecret or superSecret). If so, then most access to the field will be denied. However, the "authorized users" section allows the specified users to bypass the restriction.

In yet another embodiment, the injected mapping behavior may comprise a temporary or conditional mapping behavior that causes the access or modification of data to be recorded if it matches a rule set defined by the dynamic adjustment strategy. This might be appropriately named TrackUserAccessOrModification.

The embodiments above provide specific strategy implementations that are made possible using the systems and methods described herein for injecting a temporary or conditional mapping behavior into one or more field mappers of an ORM. However, it is appreciated that any of a wide variety of temporary or conditional mapping behaviors may be injected to perform any of a wide variety of alternative mapping functions. Accordingly, the list above is not exhaustive and merely provides a few examples of possible mapping strategy implementations.

Dynamically adjusting an object-relational mapping during runtime by injecting a temporary or conditional mapping behavior into one or more field mappers of an ORM allows specific mappings to be rapidly adjusted in real time without requiring specific ORM support to be embedded within the source implementation and without impact to any mappings not being adjusted.

When changes are being made to the underlying persistence layer, the system can stay "live" during the persistence layer change and transparently provide consistent behavior to an application. Additionally, these behavior adjustments can be used to monitor or recover from corrupt data, to monitor or enforce data access restrictions, and/or to allow selectively controlling high-level application features and implement workarounds for some common application errors.

As used herein, an ORM may include one or more field mappers that are each configured to map a particular entity field from the persistence layer to the object. For example, an instance of a StringFieldMapper might be instantiated to be responsible to map a database column "first_name" from an SQL result set to the Person object field "firstName".

A dynamic adjustment strategy may be defined by a user, such as a system administrator, or automatically by a system in response to an error. The dynamic adjustment strategy may define one or more field mappings to adjust, the mapping behavior to be injected, and whether the injected behavior mapping should be temporal-based (e.g., temporary) or conditional-based. The dynamic adjustment strategy may wrap the original mapping strategy in with a dynamically injectable mapping behavior that can be customized during runtime. In various embodiments, the dynamic adjustment strategy may include a configuration payload that defines any additional settings for a specific adjustment strategy implementation.

In a conditional injected behavior mapping, a "hook" may be defined that specifies when the injected behavior mapping should override the original mapping behavior/strategy. The hook may define when the injected behavior adjustment should be applied as the field mapper interacts with the persistence layer. This may be implemented with standard operations such as create, read, update, delete, etc.

As described herein, the dynamic adjustment strategy may be implemented by initializing the system with the original field mapper wrapped in a dynamic adjustment strategy. The dynamic adjustment strategy may use the original mapping to imply configuration to reduce the need for explicit configuration and to reduce the risk of unintentionally mismatched configuration between the injected behavior mapping and the original mapping behavior.

When a field adjustment is applied (or updated or removed) for a given field mapper, the standard ORM field "mapper" instance may be wrapped along with an "injected strategy mapper." The injected strategy mapper may contain the specific strategy implementation defined by the configured adjustment at runtime; that strategy will receive the additional, strategy-specific configuration payload. The distinction between the mapper and the adjustment strategy implementations allows the adjustment strategies to be more atomic and have common mapping tasks provided. This also allows for support of multiple ORM mapping frameworks that need different mapping wrappers, but could share most of the same adjustment strategy implementations.

As previously described, the dynamic adjustment strategy may delegate execution to the original mapping based on an observed state, the occurrence or lack of occurrence of an event, a temporal configuration, a user authentication/identification, and/or another condition.

In various embodiments, the dynamic adjustment strategy may subscribe to be notified about various events. For example, the dynamic adjustment strategy may receive or obtain a notification that a database connection is available or unavailable. As another example, the dynamic adjustment strategy may receive or obtain a notification that a migration job has begun or been completed. The dynamic adjustment strategy may be notified of scheduled events (e.g., to revalidate its state periodically). For example, the dynamic adjustment strategy may periodically or on-demand check if the persistence layer currently supports a given field or behavior. As the dynamic adjustment strategy may be dynamically modified at any time during runtime, part of the dynamic adjustment strategy implementation may be to immediately adjust based on a change to its own configuration. In some embodiments, a dynamic adjustment strategy may be modifiable only at certain states during operation.

When a new mapping adjustment is injected, notifications may be rapidly distributed to all applicable deployments to maintain consistency (for example, to a cluster of servers). A mass injection and/or notifications may be implemented with message calls or a shared object structure. A dynamic adjustment strategy implementation may be contextually aware of its current state, the current state of the application, and/or the current state of the underlying relational persistence layer.

Embodiments may include various steps, which may be embodied in machine-executable instructions to be executed by a computer system. A computer system includes one or more general-purpose or special-purpose computers (or other electronic devices). The computer system may include hardware components that include specific logic for performing the steps or may include a combination of hardware, software, and/or firmware.

Embodiments may also be provided as a computer program product including a computer-readable medium, e.g., a non-transitory computer-readable medium, having stored thereon instructions that may be used to program a computer system or other electronic device to perform the processes described herein. The computer-readable medium may include, but is not limited to: hard drives, floppy diskettes, optical disks, CD ROMs, DVD ROMs, ROMs, RAMs, EPROMs, EEPROMs, magnetic or optical cards, solid-state memory devices, or other types of media/computer-readable media suitable for storing electronic instructions.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even standalone machines which communicate with other machines by physical transport of media (a so-called "sneakernet"). In particular, a suitable network may be formed from parts or entireties of two or more other networks, including networks using disparate hardware and network communication technologies.

One suitable network includes a server and several clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or combination thereof.

The network may include communications or networking software, such as the software available from Novell, Microsoft, Artisoft, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Each computer system includes at least a processor and a memory; computer systems may also include various input devices and/or output devices. The processor may include a general-purpose device, such as an Intel®, AMD®, or other "off-the-shelf" microprocessor. The processor may include a special purpose processing device, such as an ASIC, SoC, SiP, FPGA, PAL, PLA, FPLA, PLD, or other customized or programmable device. The memory may include static RAM, dynamic RAM, flash memory, one or more flip-flops, ROM, CD-ROM, disk, tape, magnetic storage, optical storage, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

The computer systems may be capable of using a floppy drive, tape drive, optical drive, magneto-optical drive, or other means to read a storage medium. A suitable storage medium includes a magnetic, optical, or other computer-readable storage device having a specific physical configuration. Suitable storage devices include floppy disks, hard disks, tape, CD-ROMs, DVDs, PROMs, random access memory, flash memory, and other computer system storage devices. The physical configuration represents data and instructions which cause the computer system to operate in a specific and predefined manner as described herein.

Suitable software to assist in implementing the invention is readily provided by those of skill in the pertinent art(s) using the teachings presented here and programming languages and tools, such as Java, Pascal, C++, C, database languages, APIs, SDKs, assembly, firmware, microcode, and/or other languages and tools. Suitable signal formats may be embodied in analog or digital form, with or without error detection and/or correction bits, packet headers, network addresses in a specific format, and/or other supporting data readily provided by those of skill in the pertinent art(s).

A relational persistence layer may comprise or consist of any number of RDBMSs, including, but not limited to RDBMSs such as Oracle, MySQL, Microsoft SQL server, PostgreSQL, DB2, Microsoft Access, SQLite, Sybase ASE, Teradata, FileMaker, Informix, Hive, SAP HANA, Firebird, Netezza, MariaDB, and others. Similarly, an object-oriented domain model may refer to the domain model used by any of a wide variety of OOPLs, including, but not limited to C++, C#, Delphi, Java, JavaScript, PHP, Python, Visual Basic, Perl, Ruby, Smalltalk, MatLab, TCL, D, .Net, and others.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular abstract data types.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Much of the infrastructure that can be used according to the present invention is already available, such as general-purpose computers, computer programming tools and techniques, computer networks and networking technologies, digital storage media, authentication, access control, and other security tools and techniques provided by public keys, encryption, firewalls, and/or other means.

While the various examples provided herein related to ORMs for facilitating communication between relational persistence layers and object-oriented applications, the same principles can be applied to any system in which it is necessary to provide access to data stored in a first manner within a database to an application expecting to access data stored in a second manner. For instance, the manner in which the database stores and provides access to data may be file system-based, hierarchical, network-based, relational, or object-oriented. The manner in which the application expects to access data may be different from the manner in which the database stores and provides access to data. Accordingly, a database mapper of some variety (e.g., ORM or file system-based to relational) may be useful. Many of the principles, embodiments, methods, systems, and the like disclosed herein can be adapted for use in database mappers besides the ORMs used as examples herein.

The embodiments of the disclosure may be understood by reference to the drawings, wherein like elements are designated by like numerals throughout. In the following description, numerous specific details are provided for a thorough understanding of the embodiments described herein. However, those of skill in the art will recognize that one or more of the specific details may be omitted, or other methods, components, or materials may be used. In some cases, operations are not shown or described in detail in order to avoid obscuring more important aspects of the disclosure.

Furthermore, the described features, operations, or characteristics may be combined in any suitable manner in one or more embodiments. The order of the steps or actions of the methods described in connection with the embodiments disclosed may be changed as would be apparent to those skilled in the art. Thus, any order in the drawings or detailed description is for illustrative purposes only and is not meant to imply a required order, unless specified to require an order.

FIG. 1 is a functional block diagram that includes an RDBMS 110 as part of a relational persistence layer. An ORM 120 with multiple static field mappers 121, 122, 123, 124, and 129 is illustrated as acting as in intermediary between the RDBMS 110 and an object-oriented domain model 150 used by an object oriented application and/or associated programming languages (referred to using the same reference number). In the illustrated embodiment, the ORM 120 may map various entity fields of the RDBMS 110 via each of a plurality of field mappers 121-129. There may be any number of field mappers, but only five are shown for simplicity. Each field mapper may be programmed to map an entity field to the object-oriented domain model in a particular manner. While the field mappings may be modified at will in various embodiments, they may not be modifiable during runtime, but rather require re-initialization to make changes.

As described above, the RDBMS 110 may store data in tables having rows and columns (fields) according to logic structure or schema. The ORM 120 may generate a virtual object-oriented database of the relational persistence layer that is transparently accessible by the object-oriented application 150. Thus, a programmer programming in an OOPL can interact with the database as if it were an object-oriented database and ignore the complexities of interacting with a relational database using an OOPL. The ORM allows the object-oriented application to transparently use the relational database as part of an underlying persistence layer to store persistent data.

The functional block diagram includes representations of the dataflow. Arrow 112 illustrates the ORM 120 retrieving data and mapping entity fields to the object-oriented domain model 150. Arrow 115 illustrated the ORM 120 performing the reverse mapping to persist data in the RDBMS 110. Arrows 132 and 135 illustrated the object-oriented domain model 150 interacting with the ORM 120.

Figure 2:
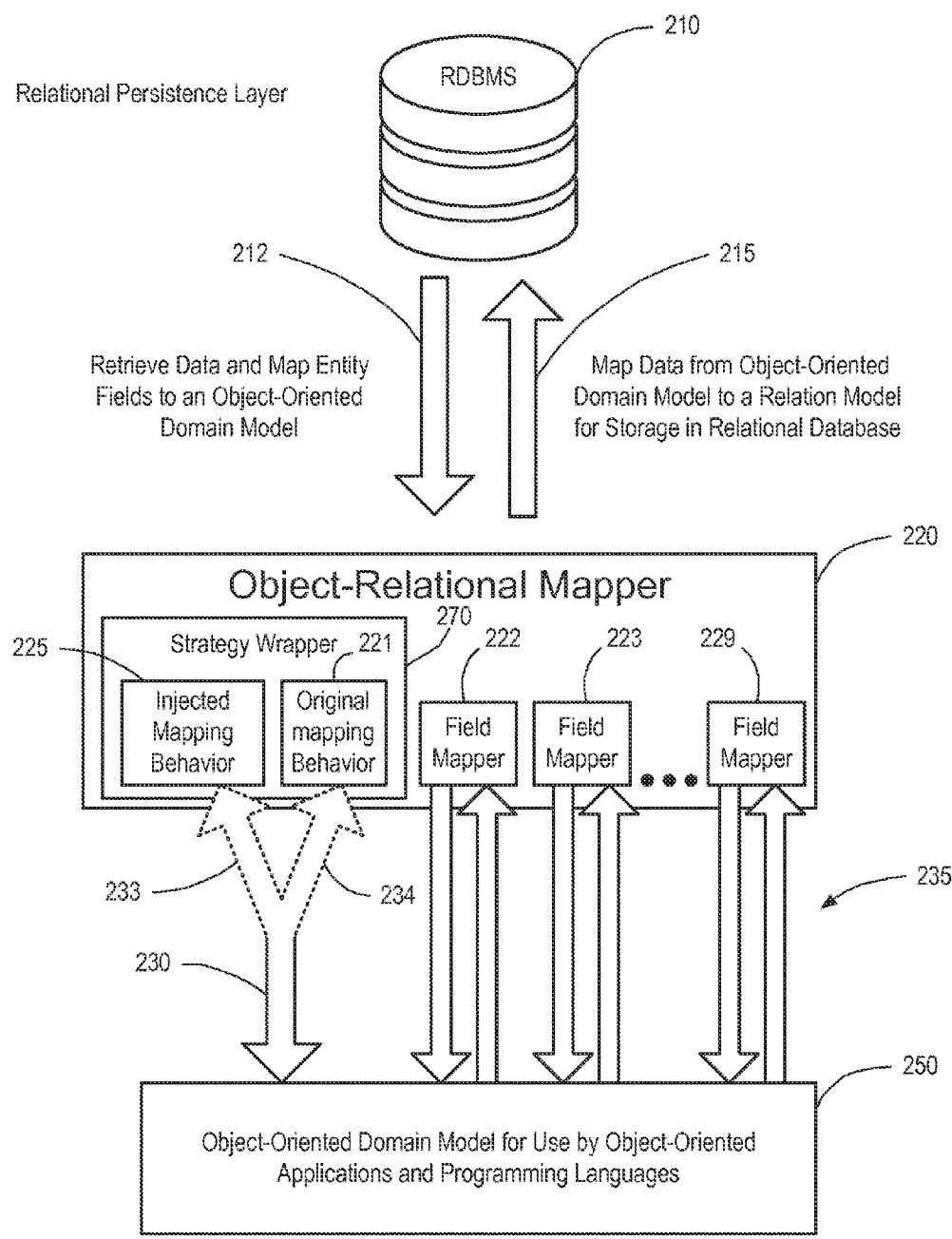
FIG. 2 is a functional block diagram that includes an ORM with a dynamic adjustment strategy wrapper associated with at least one of the field mappers that injects a temporary or conditional mapping behavior.

FIG. 2 is a functional block diagram that includes an ORM 220 with a dynamic adjustment strategy wrapper 270 associated with an original mapping behavior 221 that injects a temporary or conditional mapping behavior 225. Similar to the embodiment described in conjunction with FIG. 1, the ORM 220 may provide a generic mapping or semi-custom mapping of various entity fields from the relational persistence layer (RDBMS 210) to a chosen object-oriented domain model 250.

Normally, the field mappers 222, 223, and 229 are considered static in that once they are initialized and mapped, they do not change. In fact, once initialized, the ORM 220 may generate an error if an object-oriented application 250 attempts to access (load or persist) data in a non-existent entity field or to access data using an incorrect data type.

In various embodiments, an ORM 220 may allow for an adjustment of one or more field mappers 222, 223, and 229 prior to initialization. That is, the system may be shut down, and the mapping behaviors of one or more field mappers may be modified or adjusted prior to system initialization. Once the system is initialized, the field mappers 222, 223, and 229 may implement the modified or adjusted mapping behavior. However, such pre-initialization adjustments cannot be performed in real time or during runtime.

In various embodiments, the system may allow for the dynamic modification of an ORM 220 behavior associated with a relational persistence layer 210 in real time (e.g., a runtime modification/adjustment that does not require re-initialization or shutdown) without any significant performance impact. The ability to dynamically adjust persistence behaviors allows an application system to remain stable even if the underlying persistence mechanism (i.e., persistence layer 210) may be changing arbitrarily, may be "out of sync," and/or may be undergoing a migration.

In various embodiments, an object-oriented application 250 may need to access (e.g., store, read, write, modify, persist, etc.) data stored in a relational persistence layer, such as the RDBMS 210. The object-oriented application 250 may interact with the relational persistence layer via the ORM 220 (see arrows 212, 215, and 235 generally). The ORM 220 may include various field mappers 222, 223, and 229 each configured with an original mapping strategy for mapping an entity field from the relational persistence layer (RDBMS 210) to an object-oriented domain model 250, such as an object-oriented model used by Java or C++.

To provide for dynamic runtime modification of a field mapper, one or more field mappers, e.g., field mapper associated with the original mapping behavior 221, may be wrapped in a dynamic adjustment strategy wrapper 270 that wraps the original mapping behavior 221, for mapping entity field(s) with an injected temporary or conditional mapping behavior 225 that is different from the original mapping strategy 221. Alternatively and/or additionally, a field mapper may be "injected" in the sense that an entirely new field mapping is created. That is, the same principles may be utilized to inject an entirely new field mapping instead Similarly, intentionally non-functioning field mappings may be initialized in anticipation of receiving an injected conditional (or permanent) field mapping.

The injected temporary or conditional mapping behavior 225 may be modified and/or adjusted during runtime without requiring re-initialization. Accordingly, the temporary or conditional mapping behavior 225 may be injected into the ORM 220 in real time and or the mapping behavior 225 may be modified (e.g., a new injection) in real time.

Although dynamically modifiable, the relatively static ORM 220 can maintain high performance for established mappings 222, 223, and 229 and allow the dynamic adjustments to compensate for any disagreement between the ORM 220 and the persistence implementation (i.e., persistence layer and RDBMS 210).

Dynamically adjusting an object-relational mapping during runtime by injecting a temporary or conditional mapping behavior 225 into one or more field mappers may be accomplished by wrapping the field mapper associated with the original mapping behavior 221 within a strategy wrapper 270 and allowing a dynamic mapping behavior 225 to be injected during runtime. While illustrated as having the original mapping behavior 221 within a box labeled strategy wrapper 270, the actual implementation may or may not impose such a hierarchal order. For instance, a selected field mapper may be initialized with a dynamic mapping strategy that allows for a runtime injection of a modified mapping behavior. Any illustrated hierarchy throughout the figures is merely a result of the limitations of functional block diagrams.

Dynamically injectable mapping behaviors 225 may be particularly useful in a system where the application software 250 and the persistence layer 210 need to support overlapping application versions or data migrations while maintaining uninterrupted system availability. This may be a relatively common situation in large distributed systems or in the event of rapidly iterating software deployments.

In some embodiments, the injected mapping behavior 225 may be a conditional mapping behavior. In such embodiments, the original mapping strategy of the field mapper 221 may be implemented unless specific conditions are met. For instance, in some embodiments, the conditional mapping behavior (e.g., injected field mapper 225) may override the original mapping strategy 221 when a predetermined event has occurred or is occurring.

Events that may be used to trigger an injected conditional mapping behavior might include, for example, a migration of the relational persistence layer 210 or a mismatch data type between the object-oriented application 250 and the relational persistence layer 210. In various embodiments, the event may comprise a determination that an application 250 has requested invalid access to the relational persistence layer (e.g., the specified column does not exist in the relational database 210). In such an embodiment, the injected temporary or conditional mapping behavior 225 may cause the selected field mapper (strategy wrapper 270 that includes the original field mapper functionality 221 and the injected mapping behavior 225) to return a proxy value, even though no data is actually persisted in the RDBMS 210. Thus, the wrapped field mapper 270 may effectively map a non-existent entity field from the relational persistence layer 210 to the object-oriented domain model 250 with a proxy value. In other embodiments, the concept of wrapping and injecting a temporary or conditional mapping behavior can be understood as creating an entirely new field mapping. That is, "injecting a temporary or conditional mapping behavior may including creating a new field mapper that does not include or includes a dormant/non-functional original field mapper functionality.

Arrow 230 illustrates the conditional behavior of the field mapper 221 with the conditional or temporary injected mapping behavior 225. Depending on whether specific conditions are met and/or temporal requirements are satisfied, the injected mapping behavior 233 may be used 233 or the original mapping behavior 221 may be used 234. In some embodiments, the injected mapping behavior may supplant (e.g., replace and/or delete) the original mapping behavior. In some embodiments, a strategy wrapper may be initialized independent of any existing or pre-existing field mapper and allow a dynamic runtime conditional or temporary mapping behavior to be injected on demand.

Figure 3:
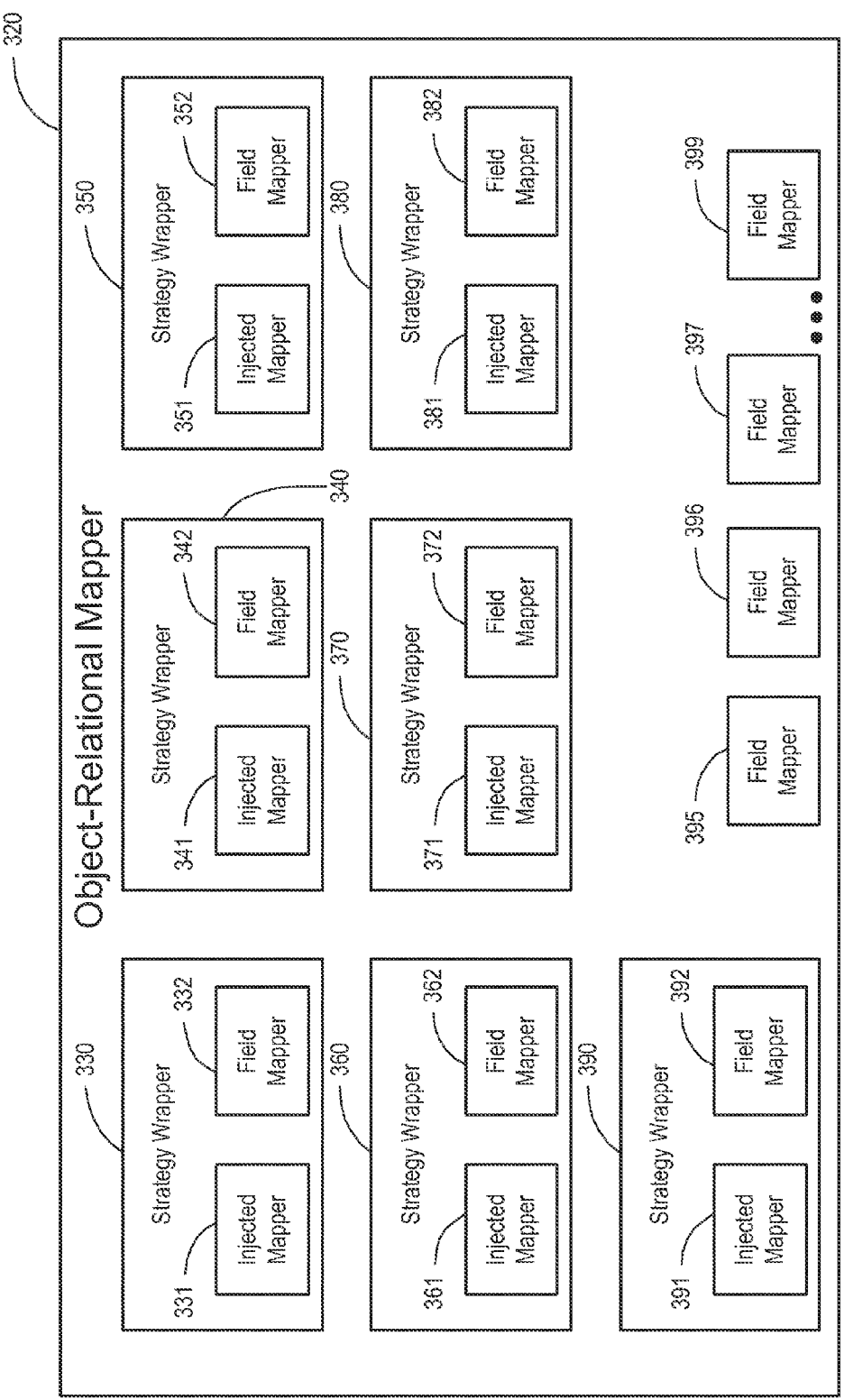
FIG. 3 illustrates a functional block diagram of an ORM with various dynamic adjustment strategy wrappers and corresponding temporary or conditional mapping behaviors.

FIG. 3 illustrates a functional block diagram of an ORM 320 with various field mappers configured with dynamic adjustment strategies (illustrates as "strategy wrappers" 330, 340, 35, 360, 370, 380, and 390). Each field mapper with a dynamic adjustment strategy may include the functionality (i.e., mapping behavior) of the original (i.e., unadjusted) field mapper 332, 342, 352, 362, 372, 382, and 392 as well as an injectable or already injected adjusted mapping behavior 331, 341, 351, 361, 371, 381, and 391 that is different from the original field mapping behavior of the corresponding field mapper. Additional, unadjusted field mappers 395, 396, 397, 399, and so on may be configured to continue mapping entity fields to an object-oriented domain model without interruption or modification. Any number of unadjusted field mappers may exist in the ORM 320. As described above, one or more of the field mappers implementing a dynamic adjustment strategy may be configured to, temporarily or conditionally, implement one or more adjusted mapping behaviors, including those described above as AdjustToAlwaysLoadSpecificValue, OnlyAdjustIfColumnDoesNotExist, AdjustFieldBasedOnContext, CheckForCorruptData, and/or CheckUserPermissions.

Figure 4:
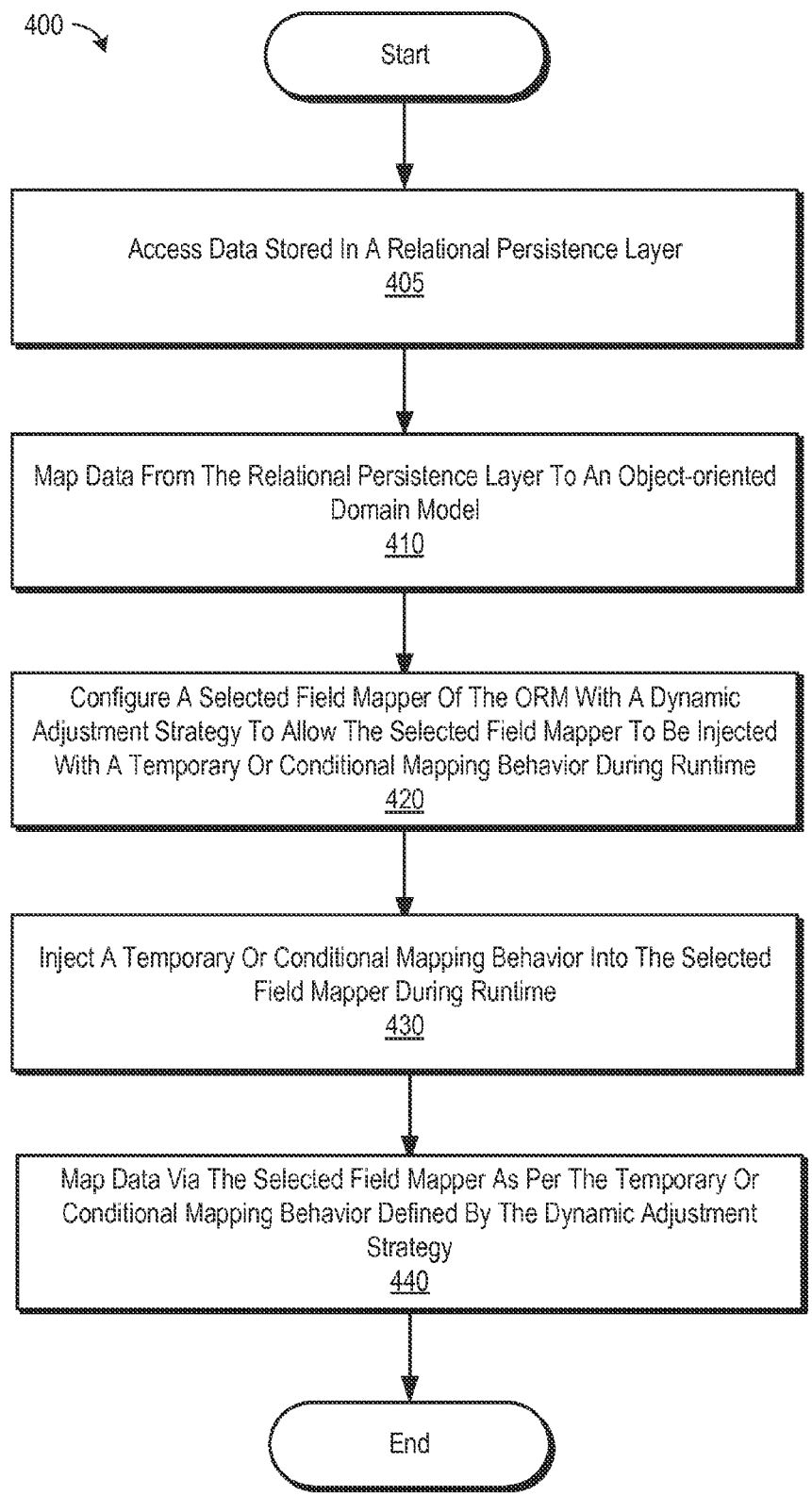
FIG. 4 provides a flow chart of one embodiment of a method for performing a dynamic runtime modification of an object-relational mapping behavior associated with a relational persistence layer.

FIG. 4 provides a flow chart of one embodiment of a method 400 for performing a dynamic runtime modification of an object-relational mapping behavior associated with a relational persistence layer. As illustrated, data may be accessed 405 from a relational persistence layer, such as a RDBMS. A ORM may map 410 data from the relational persistence layer to an object-oriented domain model, such as a domain model used by an application written, at least partially, in Java, C++, or another OOPL.

A selected field mapper (or a plurality of field mappers) may be configured 420 with a dynamic adjustment strategy to allow the selected field mapper to be injected with a temporary or conditional mapping behavior during runtime. For example, the functionality of an unmodified field mapper may be "wrapped" together with a dynamically injectable mapping behavior that can be injected/modified during runtime, at 430. In some embodiments, the injected mapping behavior may lie dormant while the original mapping behavior of the field mapper is implemented. Based on a detected event, a satisfied condition, a temporal event, and/or other trigger or "hook," a dynamically injected mapping behavior may be used to map data as defined by the dynamic adjustment strategy in conjunction with the injected mapping behavior, at 440.

Figure 5:
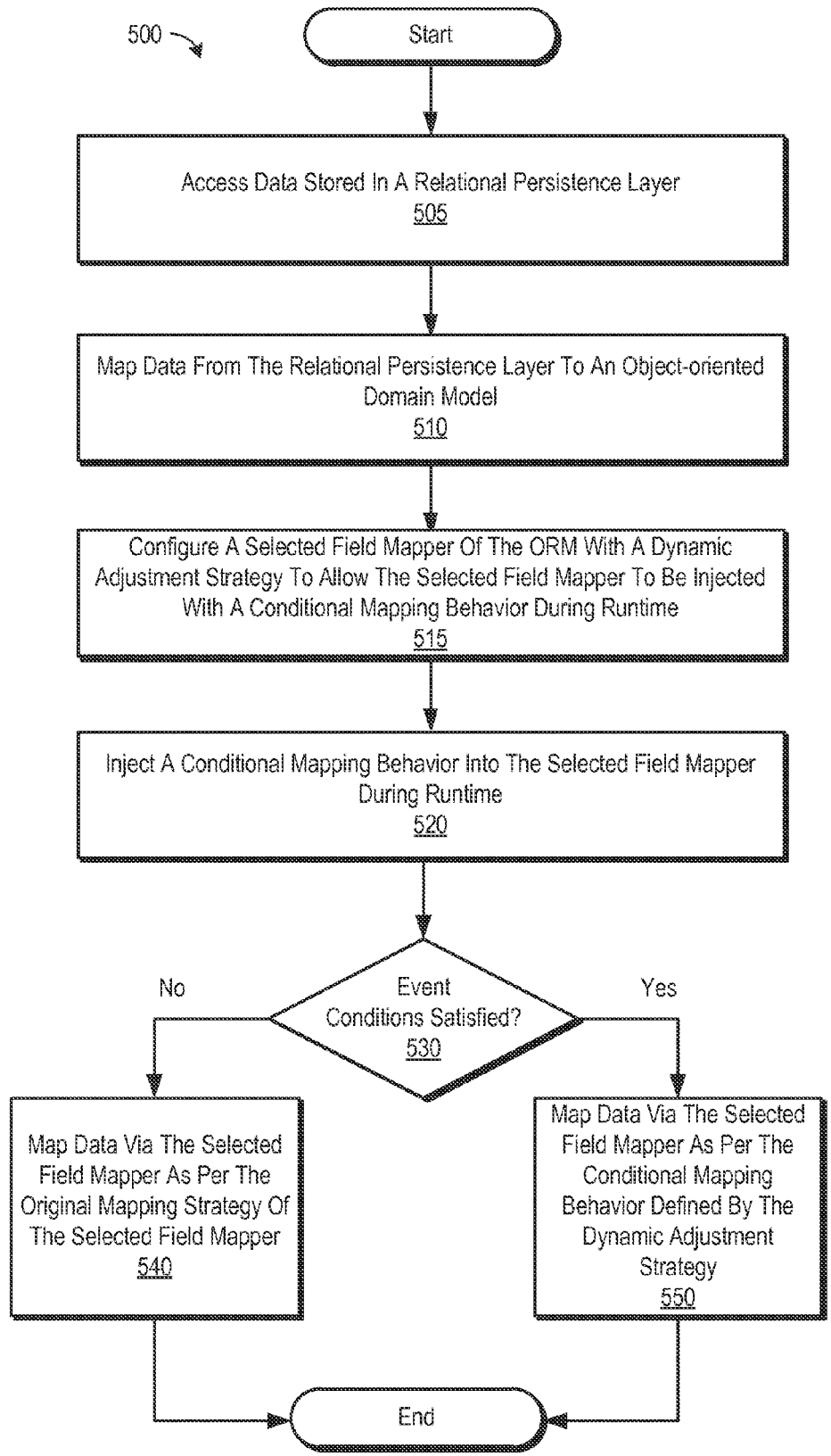
FIG. 5 provides a flow chart of a specific embodiment of a method for performing a dynamic runtime modification of an object-relational mapping behavior associated with a relational persistence layer.

FIG. 5 provides a flow chart of a specific embodiment of a method 500 for performing a dynamic runtime modification of an object-relational mapping behavior associated with a relational persistence layer. As in other embodiments, a relational persistence layer may provide access to data stored 505 in a relational database. An ORM may map data from the relational persistence layer to an object-oriented domain model 510. For example, in some embodiments a virtual object-oriented database may be created for use during runtime and data may be reverse-mapped back to the relational database for persistence. One or more field mappers may be configured 515 with a dynamic adjustment strategy to allow for the injection of a conditional mapping behavior.

The field mapper may be initialized with a dynamic adjustment strategy that allows for the runtime-injection of various modified mapping behavior schemas. After initialization, during runtime, and without interrupting access to the relational database, a conditional mapping behavior may be injected 520 into the selected field mapper with the dynamic adjustment strategy. If the conditional event is not satisfied, at 530, then data may be mapped 540 by the selected field mapper using the original, unmodified mapping strategy/schema of the selected field mapper. If, however, the conditional event of the conditional mapping behavior is satisfied, at 530, then data may be mapped 550 by the selected field mapper as per the conditional mapping behavior as permitted by the dynamic adjustment strategy.

Figure 6:
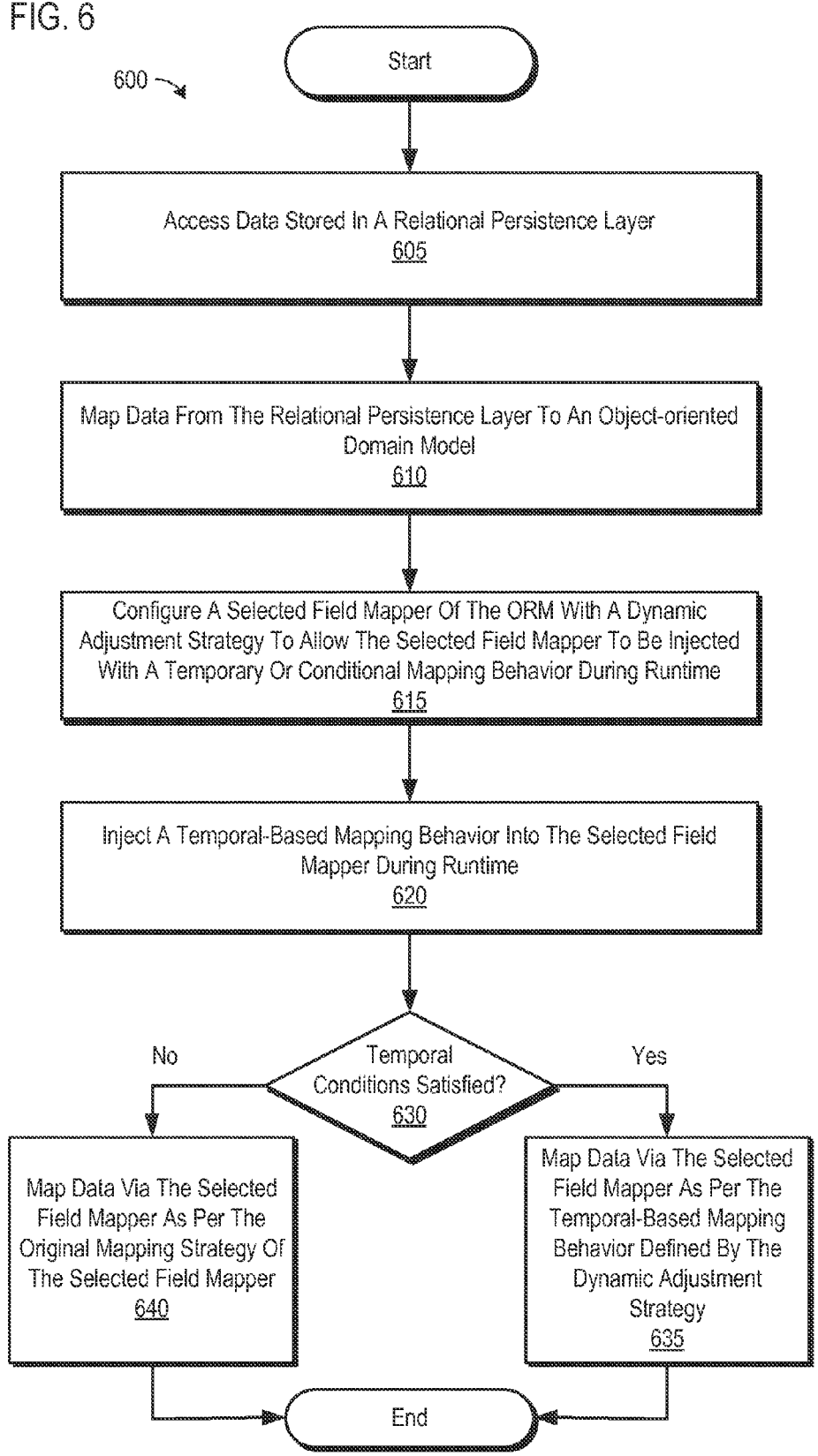
FIG. 6 provides a flow chart of another specific embodiment of a method for performing a dynamic runtime modification of an object-relational mapping behavior associated with a relational persistence layer.

FIG. 6 provides a flow chart of another specific embodiment of a method 600 for performing a dynamic runtime modification of an object-relational mapping behavior associated with a relational persistence layer. As in other embodiments, a relational persistence layer may provide access to data stored 506 in a relational database. An ORM may map data from the relational persistence layer to an object-oriented domain model 610. For example, in some embodiments a virtual object-oriented database may be created for use during runtime and data may be reverse-mapped back to the relational database for persistence. One or more field mappers may be configured 615 with a dynamic adjustment strategy to allow for the injection of a temporary or conditional behavior.

Again, the field mapper may be initialized with a dynamic adjustment strategy that allows for the runtime-injection of various modified mapping behavior schemas. After initialization, during runtime, and without interrupting access to the relational database, a temporal-based mapping behavior may be injected 620 into the selected field mapper with the dynamic adjustment strategy. For example, the temporal-based mapping behavior may modify the mapping behavior of the selected field mapper from the time of injection to a later time, or from a time T1 to a time T2. The times T1 and T2 may be defined in absolute terms, e.g., 1:00 PM to 3:30 PM, or they may be defined based on events. For example the time T1 may be based on a notification that migration of the persistence layer has begun and the time T2 may be based on a notification that a migration of the persistence layer has finished.

If the temporal condition is satisfied, at 630, then data may be mapped 640 by the selected field mapper using the original, unmodified mapping strategy/schema of the selected field mapper. If, however, the temporal event of the temporal mapping behavior is satisfied, at 630, then data may be mapped 635 by the selected field mapper as per the temporal-based (i.e., temporary) mapping behavior as permitted by the dynamic adjustment strategy.

FIG. 7A illustrates an example of a standard field mapper being applied when the conditions for an injected conditional mapping behavior are not met. In the illustrated embodiment, a field "metalName" of a SponsorProduct is adjusted with a strategy OnlyAdjustIfColumnDoesNotExist. The dynamic adjustment strategy may periodically, on-prompt, or continually check if the Sponsor_product_CFG-.METAL_NM field is functioning correctly and/or available. If it is available, the OnlyAdjustIfColumnDoesNotExist strategy will let the original, unadjusted mapping behavior continue unmolested. If however, the field is identified as missing or unavailable, then a dynamically injected strategy may alter or otherwise modify the mapping behavior of the associated field mapper.

FIG. 7B illustrates an example of an injected conditional mapping behavior being implemented when a specific condition is met. In the illustrated embodiment, an AdjustToAlwaysLoadSpecificValue strategy is injected to override the original mapping function and to cause the field mapper to return a specific value instead of the data actually persisted in a relational database. The specific value, the temporal duration of the overriding mapping behavior, and/or other specification of the mapping behavior (e.g., datatype, etc.), may be specified by the dynamic adjustment strategy that is initialized during system startup and/or injected dynamically during runtime. In the illustrated embodiment, the load to filed value is set to "http://some.domain.com" and the entity save record is set to [ignore field].

As previously stated, while the various embodiments and examples provided herein are provided with respect to relational persistence layers and ORMs for mapping such databases for use by OOPLs, it is appreciated that the same principles can be applied to any persistence layer using a first organizational schema (e.g., relational database or an RDF database), an organizational schema mapper (e.g., an ORM, an RDF-to-relational mapper, an RDF-to-object-oriented mapper, etc.), and a domain model using an organizational schema different from the underlying persistence layer.

Methods and systems implementing the same may be configured to access data stored in a persistence layer using a first type of data organizational schema. The data may be mapped from the persistence layer to a domain model, where the domain model uses a second type of data organizational schema. Such mapping may be done via an organizational schema mapper (OSM). The OSM may include one or more mappers configured with an original mapping strategy to map a field from the persistence layer to the domain model.

A selected mapper of the OSM may be configured with a dynamic adjustment strategy, wherein the dynamic adjustment strategy is configured to allow the selected mapper to be injected with a temporary or conditional mapping behavior during runtime. The injected temporary or conditional mapping behavior may be different from the original mapping strategy of the selected mapper. Data may be mapped via the selected mapper as per the temporary or conditional mapping behavior defined by the dynamic adjustment strategy.

While various aspects and embodiments have been disclosed herein, other aspects and embodiments will be apparent to those skilled in the art. The various aspects and embodiments disclosed herein are for purposes of illustration and are not intended to be limiting.

What is claimed is:

1. A non-transitory computer-readable medium having instructions that, when executed by a processor, cause the processor to perform operations to cause a dynamic runtime modification of a mapping behavior associated with a persistence layer, the operations comprising:
   accessing data stored in a persistence layer;
   mapping data from the persistence layer to a domain model using a schema mapper, wherein the schema mapper comprises a plurality of field mappers each configured with an original mapping strategy to map an entity field from the persistence layer to the domain model;
   configuring a selected field mapper of the schema mapper with a dynamic adjustment strategy, wherein the dynamic adjustment strategy is configured to allow the selected field mapper to be injected with a temporary or conditional mapping behavior during runtime;
      wherein the injected temporary or conditional mapping behavior comprises an AdjustToAlwaysLoadSpecificValue mapping behavior that causes the selected field mapper to map an entity field from the persistence layer to the domain model with a specific proxy value, regardless of the actual persisted data in the entity field;
   injecting into the selected field mapper during runtime a temporary or conditional mapping behavior that is different from the original mapping strategy of the selected field mapper; and
   mapping data via the selected field mapper as per the temporary or conditional mapping behavior defined by the dynamic adjustment strategy.

2. The computer-readable medium of claim 1, wherein the schema mapper comprises an object-relational mapper, wherein the domain model comprises an object-oriented domain model, and wherein the persistence layer comprises a relational persistence layer.

3. The computer-readable medium of claim 1, wherein the dynamic adjustment strategy is configured to allow the selected field mapper to be injected with a conditional mapping behavior during runtime,
   wherein the operations comprise injecting into the selected field mapper during runtime a conditional mapping behavior that is different from the original mapping strategy of the selected field mapper, and
   wherein the conditional mapping behavior is implemented instead of the original mapping strategy of the selected field mapper in response to an event.

4. The computer-readable medium of claim 3, wherein the event comprises an application error associated with an interaction between the domain model and the persistence layer.

5. The computer-readable medium of claim 3, wherein the event comprises one of a connection to the persistence layer being unavailable, a migration of the persistence layer, and a mismatch data type between the domain model and the persistence layer.

6. The computer-readable medium of claim 3, wherein the event comprises a determination that a mapping requested via the domain model is not valid in the persistence layer, and wherein the injected temporary or conditional mapping behavior causes the selected field mapper to map a non-existent entity field from the persistence layer to the domain model with a proxy value.

7. The computer-readable medium of claim 1, wherein the persistence layer comprises a structured query language (SQL) DBMS.

8. The computer-readable medium of claim 1, wherein the domain model relates to an domain model used by an programming language selected from the group consisting of C++, Java, Javascript, C#, Perl, Python, Ruby, and PHP.

9. The computer-readable medium of claim 1, wherein the injected temporary or conditional mapping behavior comprises an OnlyAdjustIfColumnDoesNotExist mapping behavior that causes the selected field mapper to persist data in a currently non-existent entity field of the persistence layer as soon as the non-existent entity field is made available.

10. The computer-readable medium of claim 1, wherein the injected temporary or conditional mapping behavior comprises an AdjustFieldBasedOnContext mapping behavior that causes the selected field mapper to map an entity field from the persistence layer to the domain model with a contextual value, regardless of the actual persisted data in the entity field.

11. The computer-readable medium of claim 10, wherein the contextual value comprises a calculated value provided in proxy for the actual persisted data while the actual persisted data is being migrated.

12. The computer-readable medium of claim 10, wherein the contextual value comprises a predetermined value provided in proxy for the actual persisted data based on an identification of a user.

13. The computer-readable medium of claim 1, wherein the injected temporary or conditional mapping behavior comprises a CheckForCorruptData mapping behavior that causes the selected field mapper to perform an action based on a determination that persisted data is corrupt.

14. A method for dynamic runtime modification of an object-relational mapping behavior associated with a relational persistence layer, comprising:
   accessing data stored in a relational persistence layer;
   mapping data from the relational persistence layer to an object-oriented domain model using an object-relational mapper (ORM), wherein the ORM comprises a plurality of field mappers each configured with an original mapping strategy to map an entity field from the relational persistence layer to the object-oriented domain model;
   configuring a selected field mapper of the ORM with a dynamic adjustment strategy, wherein the dynamic adjustment strategy is configured to allow the selected field mapper to be injected with a temporary or conditional mapping behavior during runtime;
      wherein the injected temporary or conditional mapping behavior comprises an OnlyAdjustIfColumnDoesNotExist mapping behavior that causes the selected field mapper to persist data in a currently non-existent entity field of the relational persistence layer as soon as the non-existent entity field is made available;
   injecting into the selected field mapper during runtime a temporary or conditional mapping behavior that is different from the original mapping strategy of the selected field mapper; and mapping data via the selected field mapper as per the temporary or conditional mapping behavior defined by the dynamic adjustment strategy.

15. The method of claim 14, wherein the dynamic adjustment strategy is configured to allow the selected field mapper to be injected with a conditional mapping behavior during runtime,
wherein the operations comprise injecting into the selected field mapper during runtime a conditional mapping behavior that is different from the original mapping strategy of the selected field mapper, and
wherein the conditional mapping behavior is implemented instead of the original mapping strategy of the selected field mapper in response to an event.

16. The method of claim 15 wherein the event comprises an application error associated with an interaction between the object-oriented domain model and the relational persistence layer.

17. The method of claim 15, wherein the event comprises one of a connection to the relational persistence layer being unavailable, a migration of the relational persistence layer, and a mismatch data type between an application using the objectoriented domain model and the relational persistence layer.

18. The method of claim 15, wherein the event comprises a determination that a mapping requested via the object-oriented domain model is not valid in the relational persistence layer, and
wherein the injected temporary or conditional mapping behavior causes the selected field mapper to map a non-existent entity field from the relational persistence layer to the object-oriented domain model with a proxy value.

19. The method of claim 14, wherein the relational persistence layer comprises a structured query language (SQL) DBMS.

20. The method of claim 14, wherein the injected temporary or conditional mapping behavior comprises an AdjustToAlwaysLoadSpecificValue mapping behavior that causes the selected field mapper to map an entity field from the relational persistence layer to the object-oriented domain model with a specific proxy value, regardless of the actual persisted data in the entity field.

21. The method of claim 14, wherein the injected temporary or conditional mapping behavior comprises an AdjustFieldBasedOnContext mapping behavior that causes the selected field mapper to map an entity field from the relational persistence layer to the object-oriented domain model with a contextual value, regardless of the actual persisted data in the entity field.

22. The method of claim 21, wherein the contextual value comprises a calculated value provided in proxy for the actual persisted data while the actual persisted data is being migrated.

23. The method of claim 21, wherein the contextual value comprises a predetermined value provided in proxy for the actual persisted data based on an identification of a user.

24. A non-transitory computer-readable medium having instructions that, when executed by a processor, cause the processor to perform operations to cause a dynamic runtime modification of an database mapping behavior associated with a persistence layer, the operations comprising:
accessing data stored in a persistence layer using a first type of data organizational schema;
mapping data from the persistence layer to a domain model using a second type of data organizational schema via an organizational schema mapper (OSM), wherein the OSM comprises a plurality of mappers each configured with an original mapping strategy to map a field from the persistence layer to the domain model;
configuring a selected mapper of the OSM with a dynamic adjustment strategy, wherein the dynamic adjustment strategy is configured to allow the selected mapper to be injected with a temporary or conditional mapping behavior during runtime;
wherein the injected temporary or conditional mapping behavior comprises an AdjustFieldBasedOnContext mapping behavior that causes the selected field mapper to map an entity field from the persistence layer to the domain model with a contextual value, regardless of the actual persisted data in the entity field;
injecting into the selected mapper during runtime a temporary or conditional mapping behavior that is different from the original mapping strategy of the selected mapper; and
mapping data via the selected mapper as per the temporary or conditional mapping behavior defined by the dynamic adjustment strategy.

25. A non-transitory computer-readable medium having instructions that, when executed by a processor, cause the processor to perform operations to cause a dynamic runtime modification of a mapping behavior associated with a persistence layer, the operations comprising:
accessing data stored in a persistence layer;
mapping data from the persistence layer to a domain model using a schema mapper, wherein the schema mapper comprises a plurality of field mappers each configured with an original mapping strategy to map an entity field from the persistence layer to the domain model;
configuring a selected field mapper of the schema mapper with a dynamic adjustment strategy, wherein the dynamic adjustment strategy is configured to allow the selected field mapper to be injected with a temporary or conditional mapping behavior during runtime;
wherein the operations comprise injecting into the selected field mapper during runtime a conditional mapping behavior that is different from the original mapping strategy of the selected field mapper;
wherein the conditional mapping behavior is implemented instead of the original mapping strategy of the selected field mapper in response to an event; and
wherein the event comprises one of a connection to the persistence layer being unavailable, a migration of the persistence layer, and a mismatch data type between the domain model and the persistence layer;
injecting into the selected field mapper during runtime a temporary or conditional mapping behavior that is different from the original mapping strategy of the selected field mapper; and
mapping data via the selected field mapper as per the temporary or conditional mapping behavior defined by the dynamic adjustment strategy.

26. A non-transitory computer-readable medium having instructions that, when executed by a processor, cause the processor to perform operations to cause a dynamic runtime modification of a mapping behavior associated with a persistence layer, the operations comprising:
accessing data stored in a persistence layer;
mapping data from the persistence layer to a domain model using a schema mapper, wherein the schema mapper comprises a plurality of field mappers each configured with an original mapping strategy to map an entity field from the persistence layer to the domain model;

configuring a selected field mapper of the schema mapper with a dynamic adjustment strategy, wherein the dynamic adjustment strategy is configured to allow the selected field mapper to be injected with a temporary or conditional mapping behavior during runtime;

wherein the operations comprise injecting into the selected field mapper during runtime a conditional mapping behavior that is different from the original mapping strategy of the selected field mapper;

wherein the conditional mapping behavior is implemented instead of the original mapping strategy of the selected field mapper in response to an event;

wherein the event comprises a determination that a mapping requested via the domain model is not valid in the persistence layer, and wherein the injected temporary or conditional mapping behavior causes the selected field mapper to map a non-existent entity field from the persistence layer to the domain model with a proxy value;

injecting into the selected field mapper during runtime a temporary or conditional mapping behavior that is different from the original mapping strategy of the selected field mapper; and mapping data via the selected field mapper as per the temporary or conditional mapping behavior defined by the dynamic adjustment strategy.

* * * * *